щ

United States Patent [19]
Kobayashi et al.

[11] Patent Number: 5,680,203
[45] Date of Patent: Oct. 21, 1997

[54] IMAGE PROCESSOR HAVING A DOCUMENT CONVEYOR WITH DOCUMENT SUPPRESSING ROLLERS AND A DOCUMENT SUPPRESSING PLATE, PROVIDING A UNIFORM SPACE FOR DOCUMENT PASSAGE

[75] Inventors: Hiroshi Kobayashi; Kenji Sakaue; Yoshihiro Ando; Motohisa Miyazaki, all of Osaka, Japan

[73] Assignee: Mita Industrial Co., Ltd., Osaka, Japan

[21] Appl. No.: 402,523

[22] Filed: Mar. 10, 1995

[30] Foreign Application Priority Data

Mar. 15, 1994 [JP] Japan ................................. 6-072622

[51] Int. Cl.$^6$ ........................................ G03B 27/62
[52] U.S. Cl. ........................................ 355/76; 358/498
[58] Field of Search ........................... 355/75, 76, 231; 358/488, 498; 399/367

[56] References Cited

U.S. PATENT DOCUMENTS

| | | | |
|---|---|---|---|
| 3,947,111 | 3/1976 | Hoppner | 355/75 X |
| 4,194,837 | 3/1980 | Tani et al. | 355/75 |
| 4,933,717 | 6/1990 | Miura et al. | 355/76 |
| 5,338,018 | 8/1994 | Nagao et al. | 355/75 X |
| 5,339,139 | 8/1994 | Fullerton et al. | 355/75 X |

FOREIGN PATENT DOCUMENTS

| | | |
|---|---|---|
| 280210 | 2/1988 | European Pat. Off. . |
| 363807 | 4/1989 | European Pat. Off. . |
| 435695 | 12/1990 | European Pat. Off. . |

OTHER PUBLICATIONS

Patent Abstracts of Japan, vol. 008, No. 080 (M–289), 12 Apr. 1984 & JP–A–58 224929 (Canon KK), 27 Dec. 1983 *abstract*.

Patent Abstracts of Japan, vol. 011, No. 323 (M–634), 21 Oct. 1987 & JP–A–62 105841 (Canon Inc.), 16 May 1987, *abstract*.

*Primary Examiner*—Fred L. Braun
*Attorney, Agent, or Firm*—Antonelli, Terry, Stout & Kraus, LLP.

[57] ABSTRACT

An image processor, including a housing having a transparent plate disposed on the upper surface thereof, and a swing frame pivotally mounted on the housing. In the swing frame is disposed a document conveyer which includes document suppressing rollers. In a state where the swing frame is brought to the closed position, the document suppressing rollers extend over the transparent plate, maintaining a space relative thereto in the direction of width of the transparent plate. A first shaft member is mounted on the swing frame, a pair of support brackets are rotatably mounted on the first shaft member separated by a distance in the axial direction, a second shaft member is mounted on the pair of support brackets to extend in the direction of width of the transparent plate in a state where the swing frame is brought to the closed position, and the document suppressing rollers are mounted on the second shaft member. First position restriction devices are disposed in relation to the pair of support brackets and are brought into contact with the upper surface of the transparent plate so as to restrict the space between the transparent plate and the document suppressing rollers.

11 Claims, 7 Drawing Sheets

IMAGE PROCESSOR HAVING A DOCUMENT CONVEYOR WITH DOCUMENT SUPPRESSING ROLLERS AND A DOCUMENT SUPPRESSING PLATE, PROVIDING A UNIFORM SPACE FOR DOCUMENT PASSAGE

FIELD OF THE INVENTION

The present invention relates to an image processor such as an electrostatic copying machine, a facsimile machine, a document reader and the like. More specifically, the invention relates to an image processor of the type equipped with a housing and a swing frame mounted thereon to swing, and further having a transparent plate disposed on the upper surface of the housing, the swing frame being provided with a document conveyer means for conveying a document along the transparent plate.

DESCRIPTION OF THE PRIOR ART

In a typical image processor of the above-mentioned type, two kinds of transparent plates are disposed on the upper surface of the housing, i.e., a transparent plate for moving documents having a relatively small size in a direction in which the documents are conveyed and a transparent plate for stationary documents positioned neighboring the transparent plate for the moving documents. The swing frame is allowed to swing along the transparent plate for the moving documents and the transparent plate for the stationary documents on a swing axis that extends along a rear portion of the housing, and swings between a closed position at which it covers the transparent plate for the moving documents and the transparent plate for the stationary documents and an open position at which it permits these transparent plates to be exposed. In the housing is disposed a document reading means for reading documents. The document reading means includes an imaging means constituted by many CCDs (charge-coupled devices) and an optical means for projecting an image of the document onto the imaging means. In a state where the swing frame is at the closed position, the document conveyer means disposed in the swing frame conveys the documents passing on the transparent plate for the moving documents, and the document reading means reads the documents passing on the transparent plate. When a document such as a book is placed on the transparent plate for the stationary documents, the document reading means is at least partly moved to read the stationary document on the transparent plate for the stationary documents.

In order for the document reading means to properly read the document passing on the transparent plate for the moving documents, it is important that the document passes in contact with, or very close to, the upper surface of the transparent plate for the moving documents. When the document floats excessively above the upper surface of the transparent plate for the moving documents as the document passes the optical means in the document reading means is no longer capable of projecting document image onto the imaging means sufficiently clearly. Accordingly, the document conveyer means is provided with a document suppressing roller or a document suppressing plate. The document suppressing roller and the document suppressing plate are mounted on the swing frame. When the swing frame is brought to the closed position, the document suppressing roller extends over the transparent plate for the moving documents in the direction of width thereof, maintaining a space relative thereto, and at least a main portion of the documents suppressing plate extends over the transparent plate for the moving documents, maintaining a space relative thereto, on the upstream side of the document suppressing roller as viewed in a direction in which the documents are conveyed.

It is important that the document suppressing roller and the document suppressing plate be positioned very precisely with respect to the upper surface of the transparent plate for the moving documents while maintaining a very uniform predetermined space in the direction of width. When the space is too great between the transparent plate for the moving documents and the document suppressing roller or the document suppressing plate, it is no longer possible to prevent the document passing on the transparent plate for the moving documents from excessive floating. On the other hand, when the space is too small between the transparent plate for the moving documents and the document suppressing roller or the document suppressing plate, the document passing on the transparent plate is prevented from being smoothly conveyed, and the speed of conveying the document temporarily decreases, causing the image projected onto the imaging means to have distortion, or the documents are jammed.

In practice, however, it is quite difficult to bring the swing frame to the closed position very precisely with respect to the housing, though not impossible. Usually, a mechanism for mounting the swing frame on the housing is provided with a resilient means for resiliently urging the swing frame toward the closed position and/or the open position with a relatively large force. When the swing frame is repetitively turned relying upon the presence of such a resilient urging means, the space becomes nonuniform to a considerable degree between the upper surface of the housing (i.e., transparent plate for the moving documents) and the swing frame in the back-and-forth direction of the housing, i.e., in the direction of width of the transparent plate for the moving documents. In the conventional image processor, therefore, the space between the transparent plate for the moving documents and the document suppressing roller or the document suppressing plate can not be maintained stably, very precisely and very uniformly, in the direction of width due to the fact that the swing frame at the closed position inevitably loses precision and uniformity with respect to the housing.

SUMMARY OF THE INVENTION

A first object of the present invention is to provide an improved image processor which enables the document suppressing rollers mounted on the swing frame to be positioned with a predetermined space very precisely and very uniformly in the direction of width with respect to the transparent plate, which is disposed on the upper surface of the housing, when the swing frame is brought to the closed position, even in the case where the position of the swing frame at the closed position is not so precise with respect to the housing.

A second object of the present invention is to provide an improved image processor which enables both the document suppressing rollers and the document suppressing plate mounted on the swing frame to be positioned with a predetermined space very precisely and very uniformly in the direction of width with respect to the transparent plate, which is disposed on the upper surface of the housing, when the swing frame is brought to the closed position, even in the case where the position of the swing frame at the closed position is not so precise with respect to the housing.

A third object of the present invention is to accomplish the above-mentioned first object or the second object without significantly increasing the manufacturing cost.

In order to accomplish the above-mentioned first object according to the present invention, a pair of support brackets are rotatably mounted on a first shaft member which is mounted on the swing frame and which extends in the direction of width of the transparent plate, maintaining a distance in the axial direction thereof when the swing frame is at the closed position, a second shaft member is mounted on the pair of support brackets, the second shaft member extending in the direction of width of the transparent plate in a state where the swing frame is at the closed position, the document suppressing rollers are disposed on the second shaft member, first position restriction means are disposed in relation to the pair of support brackets, and the first position restriction means are brought into contact with the upper surface of the transparent plate in a state where the swing frame is at the closed position thereby to restrict a space G1 between the transparent plate and the document suppressing rollers.

In order to accomplish the above-mentioned first object of the present invention, there is provided an image processor comprising a housing having a transparent plate disposed on the upper surface thereof, and a swing frame mounted on the housing so as to be pivoted between a closed position where it covers the transparent plate and an open position where it permits the transparent plate to be exposed;

the swing frame having a document conveyer means for conveying sheet-like documents passing on the transparent plate in a state where the swing frame is located at the closed position; and the document conveyer means including document suppressing rollers which, in a state where the swing frame is located at the closed position, extend over the transparent plate, maintaining a space relative thereto in the direction of width of the transparent plate to prevent the documents passing on the transparent plate from floating up excessively; wherein a pair of support brackets are rotatably mounted on a first shaft member which is mounted on the swing frame and extends in the direction of width of the transparent plate, maintaining a space in the axial direction thereof in a state where the swing frame is at the closed position, a second shaft member is mounted on the pair of support brackets, the second shaft member extending in the direction of width of the transparent plate in a state where the swing frame is at the closed position, the document suppressing rollers are disposed on the second shaft member, first position restriction means are disposed in relation to the pair of support brackets, and the first position restriction means are brought into contact with the upper surface of the transparent plate in a state where the swing frame is at the closed position, thereby to restrict a space G1 between the transparent plate and the document suppressing rollers.

A first resilient urging means is provided to resiliently urge the pair of support brackets in a direction in which the document suppressing rollers approach the transparent plate, and the first position restriction means are brought into contact with the upper surface of the transparent plate due to the resiliently urging action of the first resilient urging means. The first resilient urging means may be constituted by a pair of spring members disposed between the pair of support brackets and the swing frame.

In order to accomplish the above-mentioned second object of the present invention, there is provided an image processor wherein the document conveyer means includes a document suppressing plate that is rotatably mounted on the second shaft member, at least a main portion of the document suppressing plate, extends over the transparent plate maintaining a space relative thereto on the upstream side of the document suppressing rollers as viewed in a direction in which the documents are conveyed in a state where the swing frame is located at the closed position, thereby to prevent the documents passing on the transparent plate from floating up excessively, a pair of second position restriction means are disposed in relation to the document suppressing plate, maintaining a distance in the direction of width of the transparent plate, and the first position restriction means are brought into contact with the upper surface of the transparent plate, and the second position restriction means are brought into contact with the upper surface of the transparent plate in a state where the swing frame is located at the closed position, thereby to restrict a space G2 between the transparent plate and the document suppressing plate.

A second resilient urging means is provided to resiliently urge the document suppressing plate in such a manner that the main portion thereof is resiliently urged in a direction to approach the transparent plate, and the second position restriction means are brought into contact with the upper surface of the transparent plate due to the resiliently urging action of the second resilient urging means. The second resilient urging means may be constituted by a pair of spring members disposed between the document suppressing plate and the swing frame at a distance in the direction of width of the transparent plate.

Desirably, a pair of position restricting pieces are disposed on the document suppressing plate at a distance in the direction of width of the transparent plate, and on each of the pair of position restricting pieces are formed a first protruded portion that downwardly protrudes nearly in match with the second shaft member and a second protruded portion located at a distance from the first protruded portion on the upstream side as viewed in a direction in which the documents are conveyed in a state where the swing frame is located at the closed position, the first protruded portion constituting the first position restriction means and the second protruded portion constituting the second position restriction means. It is desired that the space G1, between the transparent plate and the document suppressing rollers restricted by the first position restriction means, be from 0.25 to 0.35 mm, and the space G2, between the transparent plate and the document suppressing plate restricted by the second position restriction means, be from 0.45 to 0.55 mm. Desirably, the document suppressing rollers are rotated in a direction in which the documents are conveyed, and the peripheral speed of the document suppressing rollers is set to be slightly larger than the document-conveying speed of the document conveyer means. A plurality of the document suppressing rollers may be mounted on the second shaft member, spaced apart in the axial direction thereof.

Desirably, the transparent plate disposed on the upper surface of the housing is a transparent plate for the moving documents having a relatively small size in a direction in which the documents are conveyed, and on the upper surface of the housing is further disposed a transparent plate for the stationary documents close to the transparent plate for the moving documents, and the swing frame that is brought to the closed position covers the transparent plate for the moving documents as well as the transparent plate for the stationary documents, and, further, a document reading means is disposed in the housing to read the document conveyed on the transparent plate for the moving documents and to read the stationary document placed on the transparent plate for the stationary documents. Desirably, the swing frame is rotatably mounted on the housing so as to turn on a swing axis which extends at a rear portion of the housing in the direction in which the documents are conveyed along the transparent plate for the moving documents and the transparent plate for the stationary documents.

In the image processor of the present invention, when the swing frame is brought to the closed position, a pair of first position restriction means disposed in relation to the pair of support brackets are brought into contact with the transparent plate at a distance in the direction of width of the transparent plate, whereby a space G1 is restricted between the transparent plate and the document suppressing rollers. Therefore, if a mutual relationship between the pair of first position restriction means and the document suppressing rollers is very precisely set, the document suppressing rollers are positioned with a very precisely and fully uniformly predetermined space G1 in the direction of width with respect to the transparent plate.

According to the image processor of the present invention, furthermore, when the swing frame is brought to the closed position, the pair of first position restriction means disposed in relation to the pair of support brackets are brought into contact with the transparent plate at a distance in the direction of width of the transparent plate and, further, the pair of second position restriction means disposed in relation to the document suppressing plate are brought into contact with the upper surface of the transparent plate at a distance in the direction of width of the transparent plate, whereby a space G2 is restricted between the transparent plate and the document suppressing plate. Therefore, if relationships among the pair of first position restriction means, the pair of second position restriction means and the document suppressing plate are very precisely set, the document suppressing plate is positioned with a very precisely and fully uniformly predetermined space G2 in the direction of width with respect to the transparent plate.

DETAILED DESCRIPTION OF THE PREFERRED EMBODIMENTS

The invention will be described in further detail with reference to the accompanying drawings that illustrate preferred embodiments of the image processor constituted according to the invention.

Figure 1:
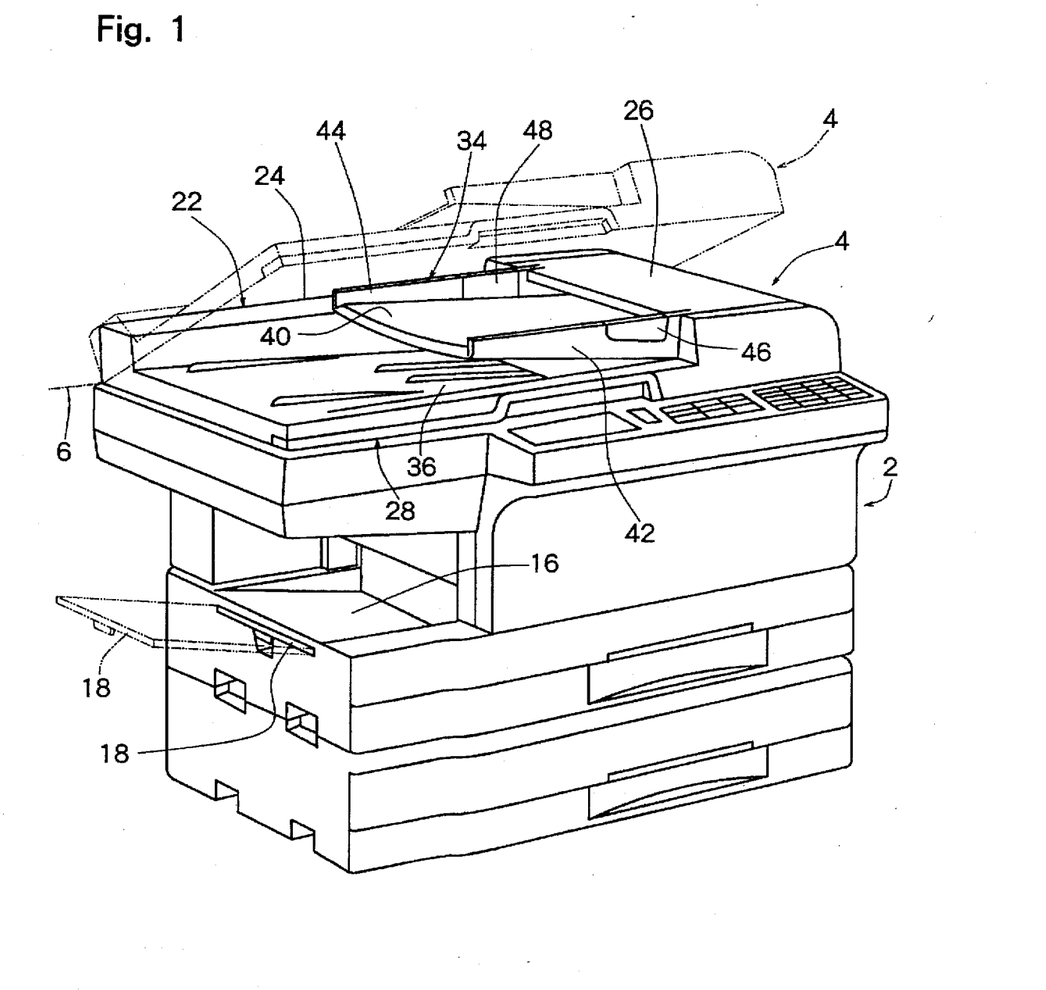
FIG. 1 is a perspective view which schematically illustrates a complete image processor improved according to the present invention.

With reference to FIG. 1, the illustrated image processor is equipped with a housing 2 and a swing frame 4 which is disposed on the housing 2. The swing frame 4 is mounted on the housing 2 via a suitable mounting mechanism (not shown) so as to swing between a closed position, indicated by a solid line, and an open position indicted by a two-dotted chain line on a swing axis 6 that extends along a rear portion of the housing 2.

Figure 2:
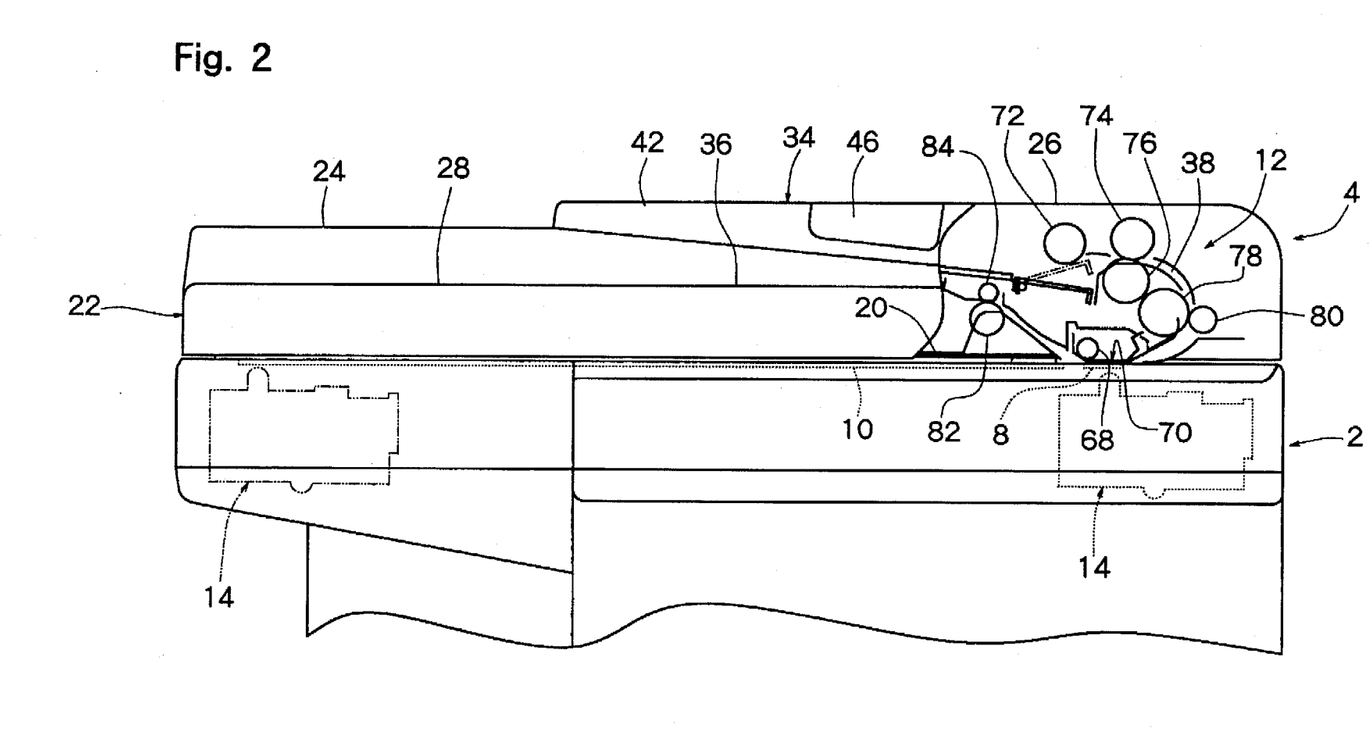
FIG. 2 is a partial front view showing, in cross section, part of the image processor of FIG. 1.

With reference to FIG. 2 together with FIG. 1, two transparent plates, i.e., a transparent plate 8 for the moving documents and a transparent plate 10 for the stationary documents, are fixed to the upper surface of the housing 2. The transparent plate 8 for the moving documents and the transparent plate 10 for the stationary documents, which are desirably made of a sheet glass, are arranged adjacent each other and substantially horizontally. The size of the transparent plate 8 for the moving documents in the direction of width (direction perpendicular to the surface of the paper in FIG. 2) is substantially the same as the size of the transparent plate 10 for the stationary documents in the direction of width (e.g., the size in the direction of length of a JIS A4 paper). The transparent plate 8 for the moving documents has a relatively small size (e.g., about 27 mm) in the right-and-left direction in FIG. 2 (in the direction in which the documents are conveyed), and the transparent plate 10 for the stationary documents has a relatively large size in the right-and-left direction in FIG. 2 (e.g., the size in the direction of length of a JIS A3 paper). A guide plate 11 (FIG. 3) is disposed between the transparent plate 8 for the moving documents and the transparent plate 10 for the stationary documents. The guide plate 11 extends toward the transparent plate 10 for the stationary documents, being tilted upwardly and, then, extends along the upper surface of the transparent plate 10 for the stationary documents.

When the swing frame 4 is brought to the closed position, the transparent plate 8 for the moving documents and the transparent plate 10 for the stationary documents are covered by the swing frame 4. When the swing frame 4 is brought to the open position, the transparent plate 8 for the moving documents and the transparent plate 10 for the stationary documents are exposed.

In the swing frame 4 is disposed a document conveyer means which as a whole is designated at 12 (the document conveyer means will be described later). The document conveyer means 12 conveys the sheet-like documents on the transparent plate 8 for the moving documents. When the document is, for example, a book, the swing frame 4 is brought to the open position, the document is placed on the transparent plate 10 for the stationary documents, and the swing frame 4 is turned toward the closed position to cover the document.

With reference to FIG. 2, a document reading means 14 is disposed at an upper portion in the housing 2 to move between a stop position (home position) indicated by a broken line and a scan start position indicated by a two-dotted chain line. The document reading means 14, which by itself may be in a known form, includes an imaging means (not shown) and an optical means (not shown). The imaging means can be constituted by a number of CCDs, and the optical means can be constituted by a document illuminating means, focusing lens and a plurality of reflectors. When the document conveyer means 12 conveys the documents passing on the transparent plate 8 for the moving documents, the document reading means 14 remains stationary at the stop position; i.e., the image of the document passing on the transparent plate 8 for the moving documents, or more specifically the image on the lower surface of the document is projected onto the imaging means via the optical means, so that the image of the document, is read. When the document is placed on the transparent plate 10 for the stationary document, the document reading means 14 moves from the scan start position indicated by a two-dotted chain line to the stop position indicated by a solid line. During this movement, the image of the document placed on the transparent plate 10 for the stationary documents, or more specifically the image on the lower surface of the document, is projected onto the imaging means via the optical means, so that the image of the document is read. Though not illustrated, in the housing 2 are disposed transmission/reception means for transmitting and receiving the image of the document and an image-forming means. The transmission/reception means, which by itself may be of a known form, receives an image signal transmitted to the image processor and transmits an image signal formed by the document reading means. Similarly, the image-forming means, which by itself may be of a known form, forms a developed image, which may be a toner image, on a sheet material such as common paper fed from a sheet member feeding mechanism (not shown) disposed in the housing 2, the developed image being based upon the image signal formed by the document reading means 14 or upon the image signal received by the transmission/reception means. As shown in FIG. 1, space of nearly a rectangular shape is formed in one side (left side in FIG. 2) of the housing 2, and the lower surface of space constitutes a receiving tray means 16. The image-forming means discharges the sheet member on which the developed image is formed, onto the receiving tray means 16. Slightly under the receiving tray means 16, an auxiliary receiving tray member 18 is disposed so as to be pulled out, as required, to the position indicated by a two-dotted chain line from a position contained in the housing 2. When the sheet member discharged from the housing 2 is relatively large, the auxiliary receiving tray member 18 is pulled out to the drawn position, and the sheet member discharged from the housing 2 is received by the receiving tray means 16 and by the auxiliary receiving tray member 18.

Figure 3:
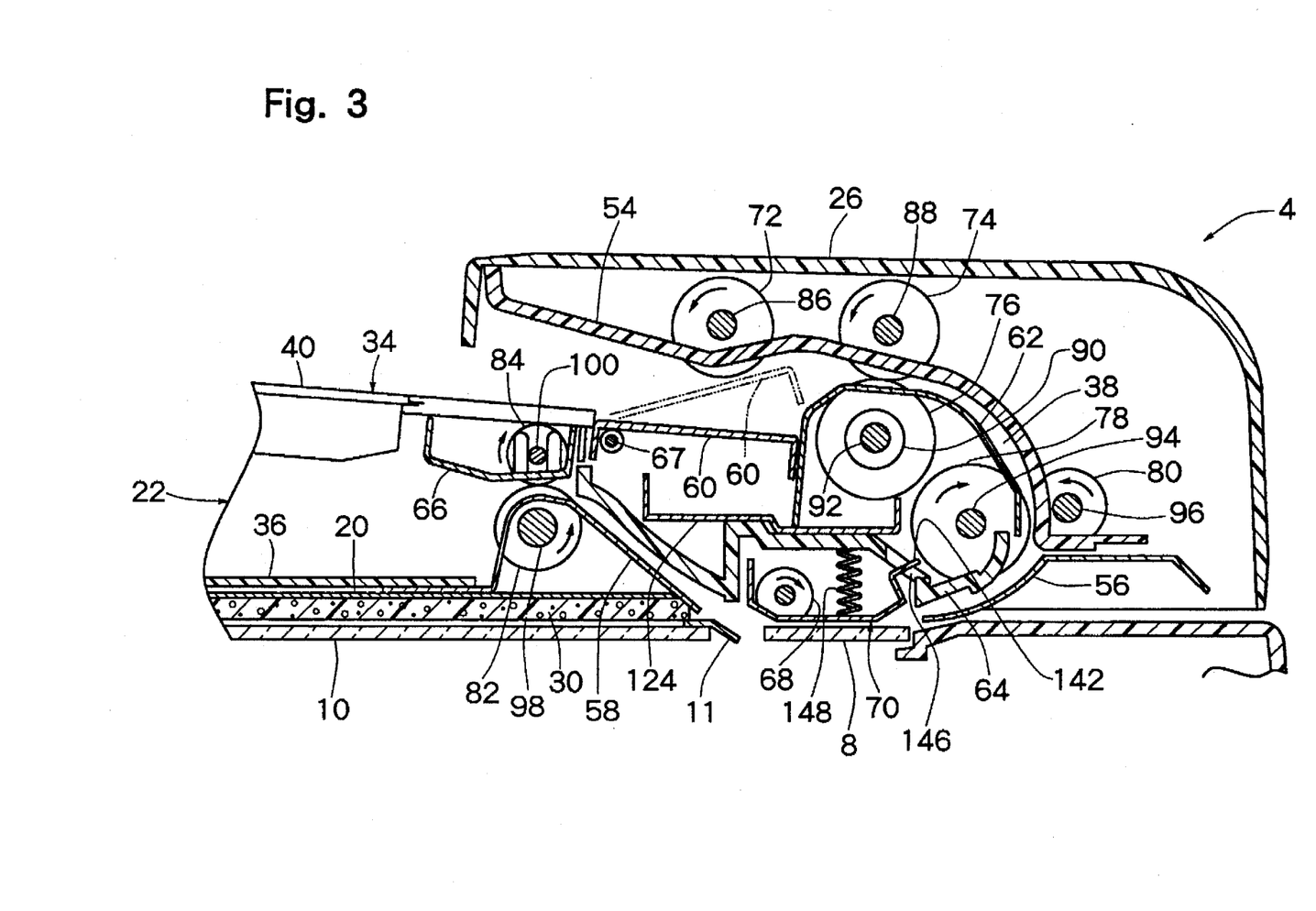
FIG. 3 is a partial vertical sectional view illustrating a document conveyer means disposed in a swing frame in the image processor of the present invention.

With reference to FIG. 3 together with FIGS. 1 and 2, the swing frame 4 includes a base plate 20 (FIGS. 2 and 3) and a cover member 22 mounted on the base plate 20. It is preferred that the base plate 20 be made of a steel plate and be pivotally mounted on a housing 2 via the mounting mechanism (not shown). The cover member 22, which can be formed by molding a suitable synthetic resin, is secured to the base plate 20 by fastening screws (not shown). The cover member 22 as a whole assumes the shape of a box with its lower surface open, and has a rear portion 24 and one side portion 26 (right side portion in FIG. 2) that are extends upwardly beyond the main portion 28. A rectangular document holder mat 30 (FIG. 3) is disposed on the lower surface of the main portion 28 of the cover member 22. It is preferred that the document holder mat 30, secured to the lower surface of the base plate 20 be formed of a sponge, and with a white sheet stuck to the lower surface thereof. When the swing frame 4 is swung from the open position to the closed position after the document is placed on the transparent plate 10 for the stationary documents, the document holder mat 30 covers the transparent plate 10 for the stationary documents and the document placed thereon.

With reference to FIGS. 1 to 3, the document conveyer means 12 disposed in the swing frame 4 includes a feeding table 34, a receiving tray means 36 and a document conveyer passage 38 that extends from the feeding table 34 up to the receiving tray means 36 in substantially a C-shape. The receiving tray means 36 is formed by the upper surface of the main portion 28 of the cover member 22. The feeding table 34 extends leftwardly, in FIG. 2, over the main portion 28 of the cover member 22 from the side portion 26 of the cover member 22. The feeding table 34 can be formed separately from the cover member 22 by molding a suitable synthetic resin, and can be coupled to the side portion 26 of the cover member 22. As required, the feeding table 34 can be molded together with the cover member 22 as a unitary structure. The feeding table 34 has a bottom surface 40 that extends rightwardly in FIG. 2, being slightly tilted downwards, and further has side walls 42 and 44 that protrude upwardly from both sides of the bottom wall 40 in the direction of width, i.e., from the front side and the rear side. Moving wall portions 46 and 48, that are capable of moving in the direction of width, are formed in side walls 42 and 44. The moving wall portions 46 and 48 are coupled together via a linking mechanism (not shown) that includes a rack and pinion and are caused to move in synchronism with each other inwardly or outwardly in the direction of width so as to be set so that the distance therebetween corresponds to the width of the document that is placed on the feeding table 34.

Figure 4:
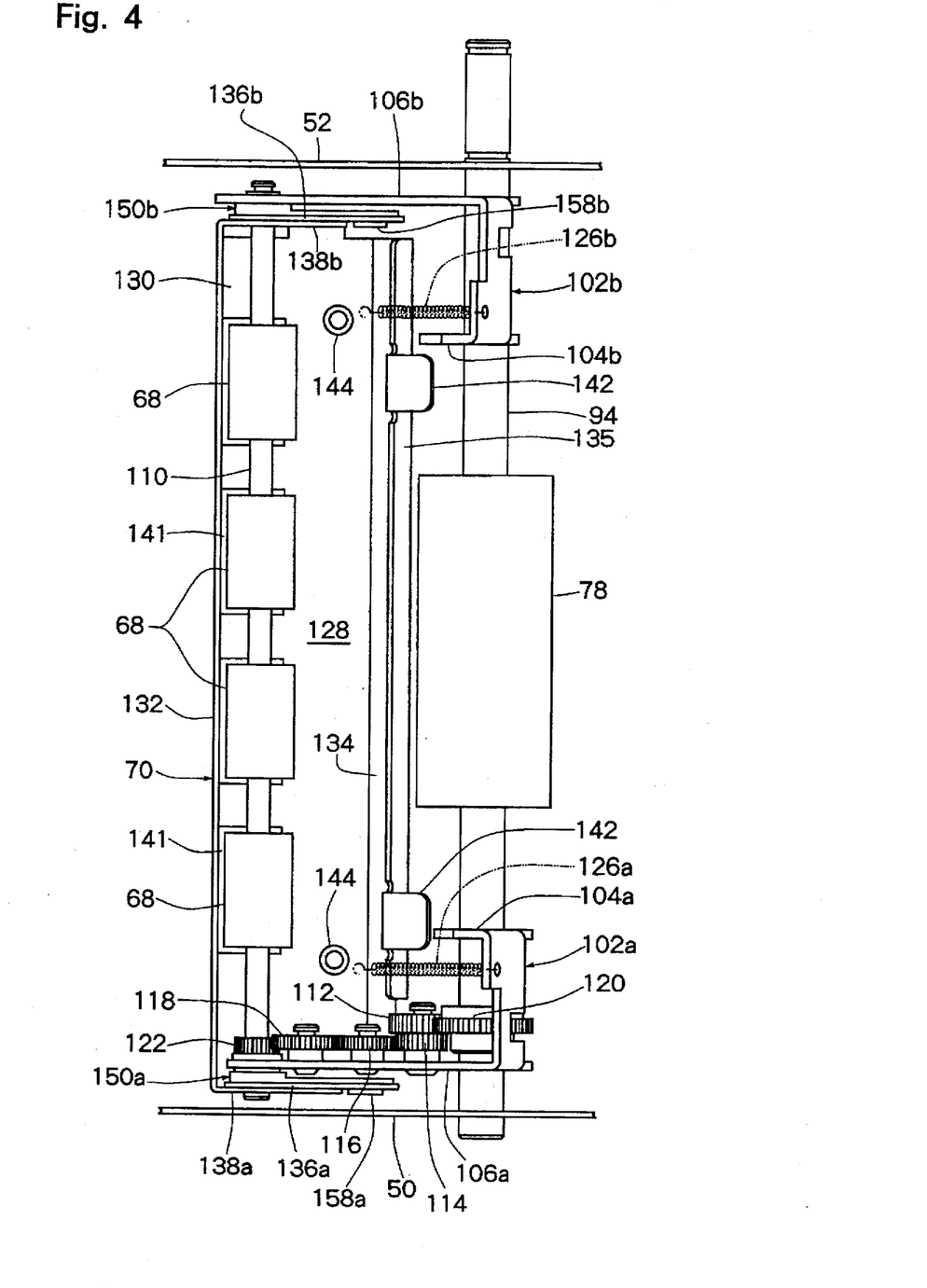
FIG. 4 is a partial lateral sectional view illustrating the document conveyer means disposed in the swing frame in the image processor of the present invention.

With reference to FIGS. 3 and 4, onto the base plate 20 of the swing frame 4 are secured a front side plate 50 and a rear side plate 52 (FIG. 4) that are positioned in the side portion 26 of the cover member 22, maintaining a distance in the direction of width (direction perpendicular to the surface of the paper in FIG. 3 or in the up-and-down direction in FIG. 4). The front side plate 50 and the rear side plate 52, which are preferably made of a steel plate, extend substantially vertically in a state where the swing frame is located at the closed position. The document conveyer passage 38 of the document conveyer means 12 is defined between the front side plate 50 and the rear side plate 52. As depicted in FIG. 3, a plurality of guide plates 54, 56, 58, 60, 62, 64 and 66 are arranged between the front side plate 50 and the rear side plate 52. It is preferred that the guide plates 54 and 64 be made of a synthetic resin and that the guide plates 56, 58, 60, 62 and 66 be made of a steel plate. The guide plates 54, 56, 58, 62, 64 and 66 are secured between the front side plate 50 and the rear side plate 52. On the other hand, the guide plate 60 is pivotally mounted on a shaft member 67 that is mounted between the front side plate 50 and the rear side plate 52, and the guide plate 60 is equipped with an electromagnetic solenoid (not shown). The guide plate 60 is located at a non-acting position, indicated by a solid line, when the electromagnetic solenoid is de-energized, and is turned in the counterclockwise direction in FIG. 3 as indicated by a two-dotted chain line when the electromagnetic solenoid is energized.

The outer side of an upstream portion (i.e., a portion on the upstream side of the transparent plate 8 for the moving documents) of the nearly C-shaped document conveyor passage 38 is defined by the guide plates 54 and 56, and the inner side of the upstream portion of the document conveyer passage 38 is defined by the guide plates 60, 62 and 64. The outer side of a downstream portion (i.e., a portion on the downstream side of the transparent plate 8 for the moving document) of the document conveyer passage 38 is defined by the guide plate 58, and the inner side of the downstream portion of the document conveyer passage 38 is defined by the guide plates 64 and 66.

The document conveyer means 12 further includes document suppressing rollers 68 and a document suppressing plate 70 that are positioned with a predetermined space with respect to the transparent plate 8 for the moving documents in a state where the swing frame 4 is located at the closed position. A white paint is coated on, or a white sheet is stuck to, the peripheral surface of each document suppressing roller 68. The rollers 68 can be formed of a synthetic rubber or a suitable synthetic resin. A white sheet is stuck to, or a white paint is coated on, the lower surface of the document suppressing plate 70, and plate 70 that can be formed of a steel plate. The document reading portion in the document conveyer passage 38 is defined between the document suppressing rollers 68 and the document suppressing plate 70 and the transparent plate 8 for the moving documents. The document suppressing rollers 68 and the document suppressing plate 70 will be described later in further detail.

With reference to FIG. 3, the document conveyer means 12 further includes a feeding roller 72, a pair of overlapped feeding-preventing rollers 74 and 76 for preventing the introduction of two or more documents that are overlapped, a pair of conveyer rollers 78 and 80, and a pair of delivery rollers 82 and 84. The feeding roller 72 is secured to a shaft member 86 and protrudes into the document conveyer passage 38 through an opening (not shown) formed in the guide plate 54. The feeding roller 72 is rotated in a direction indicated by an arrow. The overlapped feeding-preventing roller 74 is secured to a shaft member 88 and protrudes into the document conveyer passage 38 through an opening (not shown) formed in the guide plate 54. The overlapped feeding-preventing roller 74 also is rotated in the direction indicated by an arrow. The overlapped feeding-preventing roller 76 that works together with the overlapped-feeding preventing roller 74 is mounted on a shaft member 92 via a torque limiter 90, and protrudes into the document conveyer passage 38 through an opening (not shown) formed in the guide plate 62, and is pushed onto the overlapped feeding-preventing roller 74. The torque limiter 90 prevents the overlapped feeding-preventing roller 76 from being driven by the overlapped feeding-preventing roller 74 until a predetermined torque is reached. Therefore, the overlapped feeding-preventing roller 76 is driven when a torque larger than the predetermined torque is applied thereto but is not driven when the torque applied thereto is smaller than the predetermined torque.

The conveyer roller 78 is secured to a shaft member 94 and protrudes into the document conveyer passage 38 through an opening (not shown) formed in the guide plate 62. The conveyer roller 78 is rotated in a direction indicated by an arrow. The conveyer roller 80 that works in cooperation with the conveyer roller 78 is secured to a shaft member 96 and protrudes into the document conveyer passage 38 through an opening (not shown) formed in the guide plate 54. The conveyer roller 80 is pushed onto the conveyer roller 78 and is rotated in the direction indicated by an arrow, being driven by the conveyer roller 78. The delivery roller 82 is secured to a shaft member 98 and protrudes into the document conveyer passage 38 through an opening (not shown) formed in the guide plate 58. The delivery roller 82 is driven in a direction indicated by an arrow. The delivery roller 84 that works in cooperation with the delivery roller 82 is secured to a shaft member 100 and protrudes into the document conveyer passage 38 through an opening (not shown) formed in the guide plate 66. The delivery roller 84 is pushed onto the delivery roller 82, and is rotated in a direction indicated by an arrow, being driven by the delivery roller 82.

Operation of the above-mentioned document conveyer means 12 will now be briefly described. When the guide plate 60 is located at the non-acting position indicated by the solid line, the sheet-like documents are placed in a stacked state on the feeding table 34, and the front ends of the documents are positioned on the guide plate 60. The documents placed on the feeding table 34 are limited from moving rightwards in FIG. 3 as the front ends of the documents come into contact with the upper end of a portion of the guide plate 62 that extends nearly perpendicularly. To convey the documents placed on the feeding table 34 piece by piece, an electromagnetic solenoid (not shown) provided for the guide plate 60 is energized so that the guide plate 60 is pivots in the counterclockwise direction as indicated by a two-dotted chain line FIG. 3, whereby the upper surface of the uppermost document of the stack of documents is pushed by the feeding roller 72. Then, the feeding roller 72, overlapped feeding-preventing roller 74, conveyer roller 78 and delivery roller 82 are drivingly rotated in the directions indicated by their respective arrows. The feeding roller 72 feeds the uppermost document of the stack of documents, the pair of overlapped feeding-preventing rollers 74 and 76 prevent the introduction of two or more documents but permit the uppermost document only to be introduced. The pair of conveyer rollers 78 and 80 work to convey the document passing on the transparent plate 8 for the moving documents. The document suppressing rollers 68 and the document suppressing plate 70 work to prevent the document from floating up excessively as it passes on the transparent plate 8 for the moving documents. The document conveyed on the transparent plate 8 for the moving documents is delivered by the pair of delivery rollers 82 and 84 onto the receiving tray means 36.

Figure 5:
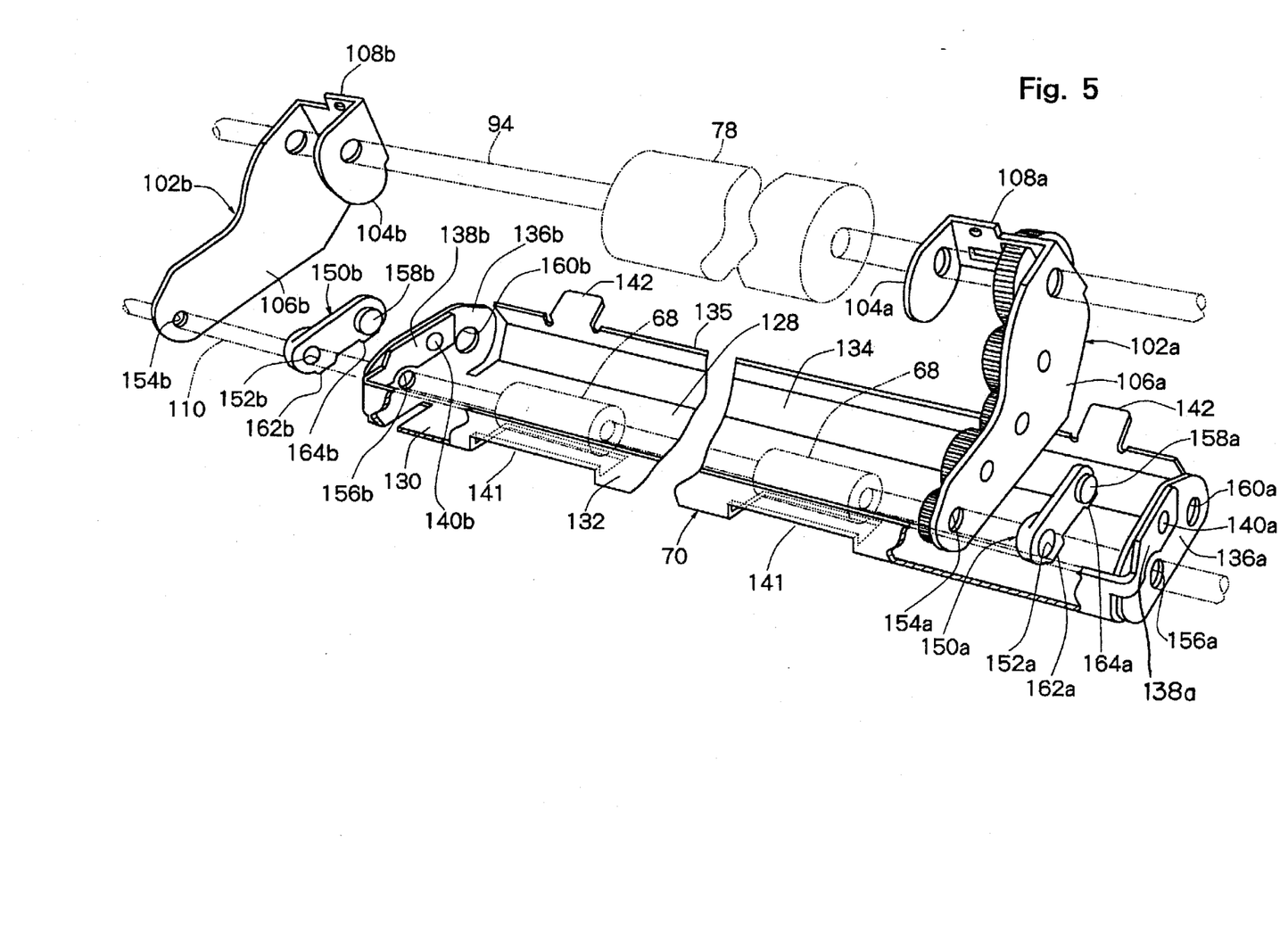
FIG. 5 is a partial perspective view illustrating document suppressing rollers and a document suppressing plate in the document conveyer means of FIGS. 3 and 4.

Next, described below in detail are constitutions of the document suppressing rollers 68 and the document suppressing plate 70 improved according to the present invention. With reference to FIGS. 4 and 5, the shaft member 94 (first shaft member), to which the conveyer roller 78 is secured, is rotatably mounted between the front side plate 50 and the rear side plate 52. On the shaft member 94 are rotatably mounted a pair of support brackets 102a and 102b, separated by a distance in the axial direction thereof (i.e., in the direction of width). The support brackets 102a and 102b have relatively short inner arm portions 104a and 104b that extend substantially perpendicularly to the shaft member 94, relatively long outer arm portions 106a and 106b that extend substantially perpendicularly to the shaft member 94, and connection portions 108a and 108b that extend substantially in parallel with the shaft member 94 and connect respectively ends on one side of the inner arm portions 104a and 104b to ends on one side of the outer arm portions 106a and 106b. The shaft member 94 extends through circular openings formed in the inner arm portions 104a and 104b and in the outer arm portions 106a and 106b. Suitable bearing members (not shown) may be interposed between the shaft member 94 and the circular openings formed in the inner arm portions 104a, 104b and in the outer arm portions 106a, 106b. Moreover, rings (not shown) may be secured to the shaft member 94 close to the inner surfaces and outer surfaces of the inner arm portions 104a, 104b and outer arm portions 106a, 106b of the support brackets 102a and 102b, so that the support brackets 102a and 102b are prevented from moving in the axial direction of the shaft member 94. A shaft member 110 (second shaft member) is rotatably mounted between the free ends of the outer arms 106a, 106b of the support brackets 102a and 102b. Onto the shaft member 110 are secured four document suppressing rollers 68 separated by a suitable distance in the axial direction thereof. As shown in FIG. 4, onto the outer arm portion 106a of the support bracket 102a are secured three short shafts that protrude inwardly substantially perpendicularly to the outer arm portion 106a. Two gears 112 and 114 are rotatably fitted to a first short shaft, a gear 116 is rotatably fitted to a second short shaft, and a gear 118 is rotatably fitted to a third short shaft. The gears 112 and 114 are formed as a unitary structure, the gear 112 being engaged with a gear 120 that is secured to the shaft member 94, and the gear 114 being engaged with the gear 116. The gear 118 is engaged with the gear 116 and further with a gear 122 that is secured to the shaft member 110. The shaft member 94 to which the conveyer roller 78 is secured is coupled to a rotary driving source (not shown), which may be an electric motor, and is rotated in the direction indicated by an arrow in FIG. 3, as described above. The rotation of the shaft member 94 is transmitted to the shaft member 110 via gears 120, 112, 114, 116, 118 and 122, and the document suppressing rollers 68 are rotated in the direction indicated by an arrow in FIG. 3. It is preferred that the peripheral speed of the document suppressing rollers 68 be set to be slightly greater than the peripheral speed of the conveyer roller 78, i.e., slightly greater than the document-conveying speed, in order to reliably avoid the occurrence of such an instance that the document-conveying speed temporarily decreases when the document moved on the transparent plate 8 for the moving documents is brought into contact with the document suppressing rollers 68. The peripheral speed of the document suppressing rollers 68 can be set to be greater by about several percent than the peripheral speed of the conveyer roller 78. When the peripheral speed of the conveyer roller 78 is, for instance, about 130 m/sec., the peripheral speed of the document suppressing rollers 68 can be set to be about 135 m/sec.

Figure 6:
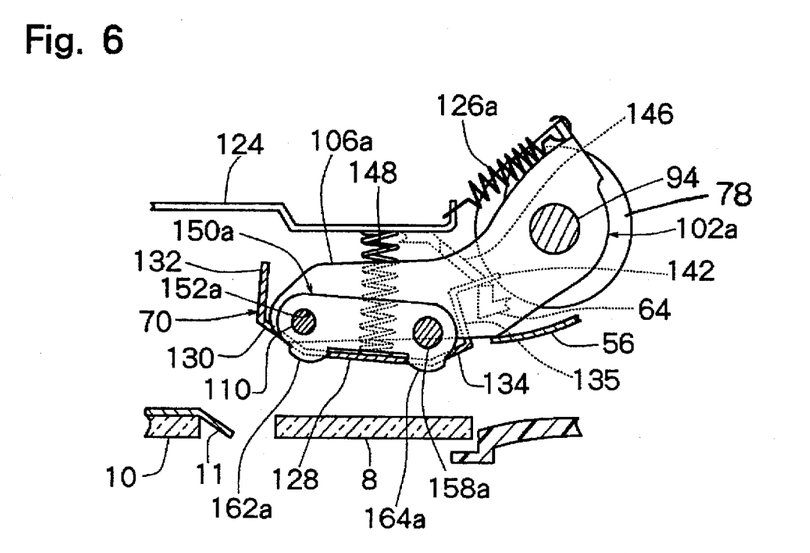
FIG. 6 is a partial vertical sectional view illustrating the document suppressing roller and the document suppressing plate in the document conveyer means of FIGS. 3 and 4 in a state where the swing frame is turned to some extent from the closed position toward the open position.

With reference to FIGS. 4, 5 and 6, an auxiliary base plate 124 (refer also to FIG. 3), which is desirably made of a steel plate, is secured between the front side plate 50 and the rear side plate 52. Resilient urging means 126a and 126b (first resilient urging means) are disposed between the auxiliary base plate 124 and the support brackets 102a, 102b, in order to resiliently urge the support brackets 102a and 102b in the counterclockwise direction in FIG. 6. The resilient urging means 126a and 126b are constituted by tension coil springs and are coupled at the first ends on one side thereof to connection portions 108a and 108b of the support brackets 102a and 102b, and are further coupled at the other ends thereof to one end (right end in FIG. 6) of the auxiliary base plate 124. Referring to FIG. 6, in a state where the swing frame 4 is slightly turned from the closed position toward the open position (in a state where the first and second position restriction means that will be described later are upwardly separated away from the transparent plate 8 for the moving documents), lower edges of the outer arm portions 106a and 106b of the support brackets 102a and 102b come into contact with the guide plate 56, whereby the support brackets 102a and 102b are limited from turning in the counterclockwise direction in FIG. 6. The resilient urging means 126a and 126b may be omitted when the support brackets 102a and 102b are very reliably urged due to their own weights in the counterclockwise direction in FIG. 6.

With reference to FIGS. 4 to 6, the document suppressing plate 70 is pivotally mounted on the shaft member 110 to which the document suppressing rollers 68 are secured. The document suppressing plate 70 has a bottom wall 128 in the shape of a flat plate, a downstream-side tilted wall 130 that extends tilted upwardly from the downstream end of the bottom wall 128 toward the downstream side, a downstream end wall 132 that extends upwardly from the downstream end of the downstream-side tilted wall 130, an upstream-side tilted wall 134 that extends tilted upwardly from the upstream end of the bottom wall 128 toward the upstream side, and an upstream end wall 135 that extends tilted upwardly from the upstream end of the upstream-side tilted wall 134 toward the downstream side.

As clearly shown in FIGS. 4 and 5, a front upright piece 136a and a rear upright piece 136b that extends substantially vertically are formed at the front edges and rear edges of the bottom wall 128, downstream-side tilted wall 130 and upstream-side tilted wall 134. Moreover, a front protruded piece 138a and a rear protruded piece 138b are formed at a front edge and a rear edge of the downstream end wall 132. The front protruded piece 138a and the rear protruded piece 138b extend substantially perpendicularly toward the upstream side relative to the downstream end wall 132. The front upright piece 136a is located on the outside, i.e., on the front side, of the outer arm portion 106a of the support bracket 102a, and the front protruded piece 138a is located on the outside, i.e., on the front side, of the front upright piece 136a. The front upright piece 136a and the front protruded piece 138a are intimately joined to each other, and are spot-welded together at a portion designated at 140a in FIG. 5. The rear upright piece 136b is located on the inside, i.e., on the front side, of the outer arm portion 106b of the support bracket 102b, and the rear protruded piece 138b is located on the inside, i.e., on the front side, of the rear upright piece 136b. The rear upright piece 136b and the rear protruded piece 138b are intimately joined to each other, and are spot-welded together in a region designated at 140b in FIG. 5.

With reference to FIGS. 4 and 5, four openings 141 are formed in the downstream portions of the document suppressing plate 70, corresponding to the four document suppressing rollers 68, and the four document suppressing rollers 68 are allowed to downwardly protrude through the openings 141. A pair of protruded pieces 142 are formed on the upstream end wall 135 of the document suppressing plate 70, and protrude toward the upstream side, separated by a distance in the direction of width. Furthermore, a pair of annular recessed portions 144 are formed in the upper surface of bottom wall 128 of the document suppressing plate 70, separated by a distance in the direction of width.

Figure 7:
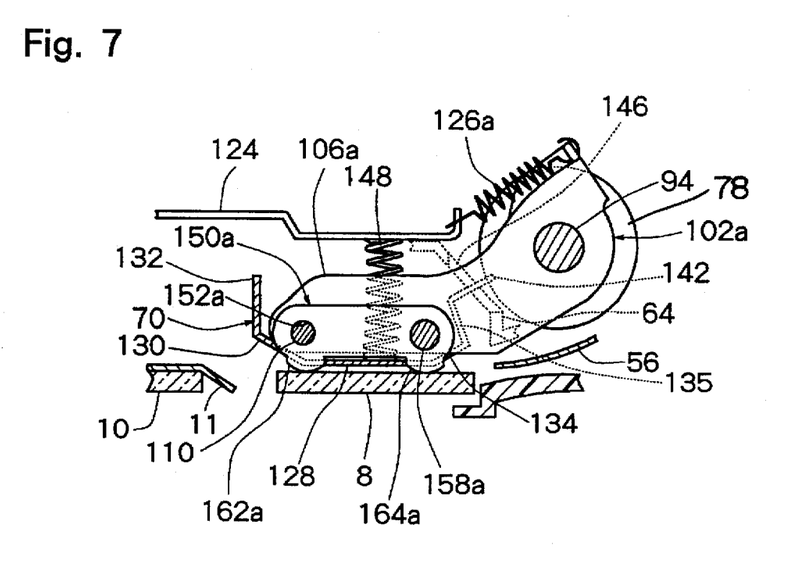
FIG. 7 is a partial vertical sectional view illustrating the document suppressing roller and the document suppressing plate in the document conveyer means of FIGS. 3 and 4 in a state where the swing frame is brought to the closed position.

With reference to FIGS. 6 and 7 as well as FIGS. 3–5, a pair of openings 146 are formed in the guide plate 64, corresponding to the pair of protruded pieces 142. Protruded pieces 142 of the document suppressing plate 70 are inserted in the openings 146 of the guide plate A resilient urging means 148 (second resilient urging means) is interposed between the document suppressing plate 70 and the auxiliary base plate 124 in order to resiliently urge the document suppressing plate 70 in the clockwise direction in FIGS. 3 and 6. The resilient urging means 148 is constituted by a pair of compression coil springs that are separated by a distance in the direction of width. The lower ends of the compression coil springs are held in the recessed portions 144 formed in the upper surface of bottom wall 128 of the document suppressing plate 70, and the upper ends of the compression coil springs extend through openings (not shown) formed in the guide plate 64 and are held in pair of annular recessed portions (not shown) formed in the lower surface of auxiliary base plate 124. Referring to FIG. 6, in a state where the swing frame 4 is turned to some extent from the closed position toward the open position (in a state where the first and second position restriction means that will be described later are upwardly separated away from the transparent plate 8 for the moving documents), the protruded pieces 142 of the document suppressing plate 70 come into contact with the lower edges of the openings 146 of the guide plate 64, and the document suppressing plate 70 is limited from turning in the clockwise direction in FIG. 6. When the document suppressing plate 70 is urged very reliably about shaft member 110, due to its own weight, in the clockwise direction in FIG. 6, the resilient urging means 148 may be omitted.

With reference to FIGS. 4 to 6, a position restriction piece 150a is disposed between the outer arm portion 106a of the support bracket 102a and the front upright piece 136a of the document suppressing plate 70, and a position restriction piece 150b is disposed between the outer arm portion 106b of the support bracket 102b and the rear upright piece 136b of the document suppressing plate 70. Circular openings 152a and 152b are formed in the upstream portions (left side portions in FIG. 6) of the position restriction pieces 150a and 150b. The position restriction pieces 150a and 150b can be formed of a suitable synthetic resin. As shown in FIG. 5, the shaft member 110, to which the document suppressing rollers 68 are secured, extends through circular openings 154a and 154b formed in the outer arm portions 106a and 106b of support brackets 102a and 102b, circular openings 156a and 156b formed in the front upright piece 136a and rear upright piece 136b of document suppressing plate 70, and circular openings 152a and 152b formed in the position restriction pieces 150a and 150b. Suitable bearing members (not shown) may be disposed, as required, between the shaft member 110 and the circular openings 152a, 152b, 154a, 154b, 156a and 156b.

Cylindrical protrusions 158a and 158b that protrudes forwardly are formed at downstream portions (right side portions in FIG. 6) of the position restriction pieces 150a and 150b. Circular openings 160a and 160b are formed in the front upright piece 136a and in the rear upright piece 136b of document suppressing plate 70 so as correspond to the protrusions 158a and 158b of position restriction pieces 150a and 150b. As will be understood from FIG. 4, the protrusions 158a and 158b of position restriction pieces 150a and 150b are inserted in the openings 160a and 160b of the front upright piece 136a and rear upright piece 136b. Thus, the position restriction pieces 150a and 150b are pivotally mounted on the shaft member 110 together with the document suppressing plate 70 as a unitary structure. As is clearly shown in FIGS. 5 and 6, the position restriction pieces 150a and 150b have a pair of protruded portions 162a and 164a, as well as a pair of protruded portions 162b and 164b that protrude downwardly. The protruded portions 162a and 162b constitute first position restriction means, and the protruded portions 164a and 164b constitute second position restriction means. The protruded portions 162a and 162b are downwardly protruding in substantial alignment with the circular openings 152a and 152b (i.e., substantially in alignment with the shaft member 110) in the up-and-down direction, and the lower edges thereof are in an arcuate shape that is substantially concentric with the circular openings 152a and 152b (i.e., substantially in concentric with the shaft member 110). The protruded portions 164a and 164b are downwardly protruding in substantial alignment with the protrusions 158a and 158b in the up-and-down direction, and the lower edges thereof are in an arcuate shape that is substantially concentric with the protrusions 158a and 158b.

As will be understood from FIGS. 4 and 5, the position restriction piece 150b is located on the outside (rear side) of document suppressing plate 70 in the direction of width, but the position restriction piece 150a is located on the inside (rear side) of the front upright piece 136a of document suppressing plate 70 in the direction of width. The protruded portions 162a and 164a of the position restriction piece 150a are downwardly protruding through notches formed at the bottom wall 128, downstream-side tilted wall 130 and the front ends of upstream-side tilted wall 132 of document suppressing plate 70.

As will be understood from the comparison of FIG. 6 with FIG. 7, when the swing frame 4 is swung from the open position to the closed position, the lower edges of protruded portions 162a, 162b and 164a, 164b of the pair of position restriction pieces 150a and 150b are brought into contact with the upper surface of the transparent plate 8 for the moving documents before the swing frame 4 is brought to the closed position. While the swing frame 4 is further swung toward the closed position after the protruded portions 162a and 162b are brought into contact with the upper surface of the transparent plate 8 for the moving documents, the support brackets 102a and 102b are pivoted in the clockwise direction in FIGS. 6 and 7, with the pivoting of the swing frame 4, against the resiliently urging action of the resilient urging means 126a and 126b. With the pivotting of the swing frame 4, furthermore, the document suppressing plate 70 pivots in the counterclockwise direction in FIGS. 6 and 7 against the resiliently urging action of the resilient urging means 148. Thus, in a state where the swing frame is located at the closed position, shown in FIG. 7, the protruded portions 162a and 162b of the pair of position restriction pieces 150a and 150b are brought into contact with the upper surface of the transparent plate 8 for the moving documents, maintaining a distance, in the direction of width, whereby the space G1 (FIG. 8) is provided fully precisely and uniformly in the direction of width between the transparent plate 8 for the moving documents and the document suppressing rollers 68 secured to the shaft member 110 that is mounted on the support brackets 102a and 102b. Furthermore, the protruded portions 164a and 164b of the pair of position restriction pieces 150a and 150b are brought into contact with the upper surface of the transparent plate 8 for the moving documents, maintaining a distance, in the direction of width, whereby the space G2 (FIG. 8) is provided fully precisely and uniformly in the direction of width between the transparent plate 8 for the moving documents and the document suppressing plate 70 or, particularly, the bottom wall 128 thereof.

Figure 8:
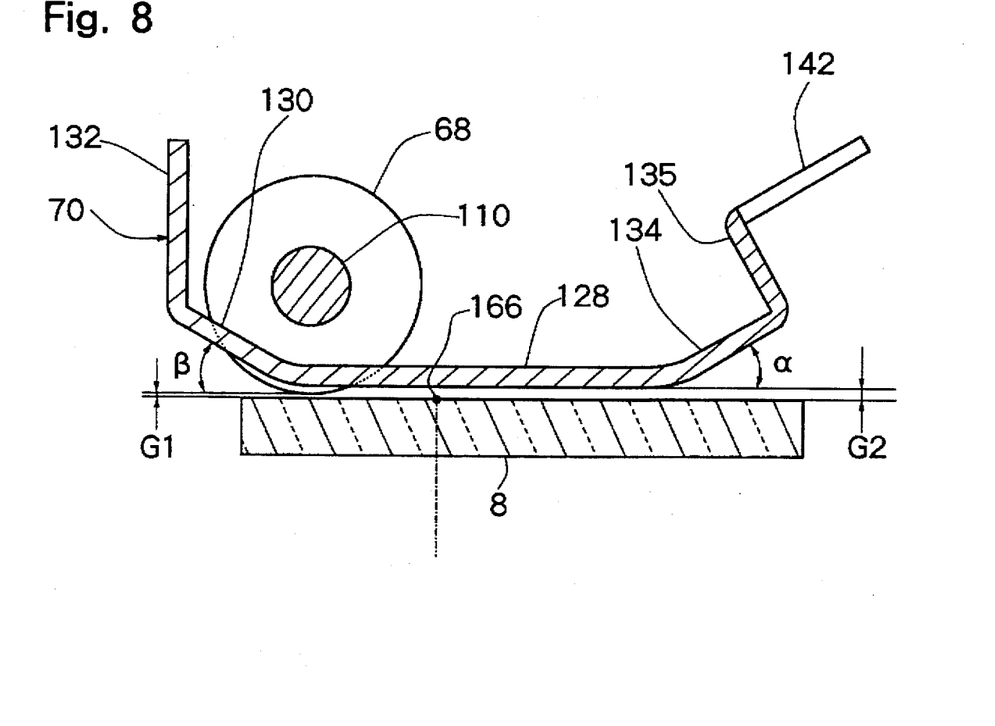
FIG. 8 is a partial vertical sectional view illustrating, on an enlarged scale, the document suppressing roller and the document suppressing plate in the document conveyer means of FIGS. 3 and 4 in a state where the swing frame is brought to the closed position.

With reference to FIG. 8, in an ordinary image processor a maximum thickness of a sheet-like document that can be conveyed by the document conveyer means 12 has been set to be about 0.2 mm. In this case, based on experiments conducted by the present inventors, it is preferred that the space G1 between the document suppressing roller 68 and the transparent plate 8 for the moving documents be from 0.25 to 0.35 mm and particularly, about 0.30 mm in a state where the swing frame 4 is brought to the closed position. It is preferred that at least the main portion of bottom wall 128 of document suppressing plate 70 extend substantially horizontally along the upper surface of the transparent plate 8 for the moving documents on the upstream side of the document suppressing rollers 68, and that the space G2 between the bottom wall 128 of document suppressing plate 70 and the transparent plate 8 for the moving documents be slightly larger than the space G1 between the document suppressing rollers 68 and the transparent plate 8 for the moving documents, and be from 0.45 to 0.55 mm and particularly, about 0.50 mm. Tilting angles α and β of the upstream-side tilted wall 134 and downstream-side tilted wall 130 of document suppressing plate 70 should be from 20 to 40 degrees, and particularly, about 30 degrees. When the document suppressing plate 70 is disposed together with the document suppressing rollers 68, the read reference line 166 of the optical means (not shown) in the document reading means 14 should extend on the upper surface of the transparent plate 8 for the moving documents in the direction of width slightly upstream of the document suppressing rollers 68, i.e., in a region where the bottom wall 128 of document suppressing plate 70 exists.

Though the present invention has been described above in detail by way of an embodiment in conjunction with the accompanying drawings, it should be noted that the invention is in no way limited to the above-mentioned embodiment only, but can be changed or modified in a variety of other ways without departing from the spirit and scope of the invention.

What we claim is:

1. An image processor comprising a housing having a transparent plate disposed on the upper surface thereof, and a swing frame mounted on said housing and adapted to be pivoted between a closed position in which said swing frame covers said transparent plate and an open position in which said swing frame permits said transparent plate to be exposed; said swing frame including document conveyer means for conveying sheet-like documents along said transparent plate when said swing frame is at said closed position; wherein said document conveyer means comprises:

a first shaft member mounted on said swing frame and extending in the direction of width of said transparent plate when said swing frame is at said closed position;

a pair of support brackets rotatably mounted on said first shaft member and spaced apart in the axial direction of said first shaft member;

a second shaft member mounted on said pair of support brackets and extending in the direction of width of said transparent plate when said swing frame is at said closed position;

a plurality of document suppressing rollers rotatably mounted on said second shaft member over said transparent plate, while remaining spaced therefrom, when said swing frame is at said closed position;

first position restriction means disposed in relation to said pair of support brackets;

a document suppressing plate pivotally mounted on said second shaft member, with at least a main portion of said document suppressing plate extending over said transparent plate on the upstream side of said document suppressing rollers with respect to the direction in which the documents are conveyed, while remaining spaced from said transparent plate, when said swing frame is at said closed position; and second position restriction means spaced from said document suppressing plate at a distance in the direction of width of said transparent plate;

said document suppressing rollers and said document suppressing plate cooperating to prevent the documents passing on said transparent plate from floating up excessively; and said first position restriction means and said second position restriction means being brought into contact with the upper surface of said transparent plate when said swing frame is at said closed position, thereby to maintain a first space between said transparent plate and said document suppressing rollers and a second space between said transparent plate and said document suppressing plate.

2. An image processor according to claim 1 wherein:

said document conveyor means further comprises resilient urging means for resiliently urging said pair of support brackets in the direction to cause said document suppressing rollers to approach said transparent plate, and said first position restriction means are brought into contact with the upper surface of said transparent plate by the resiliently urging action of said resilient urging means.

3. An image processor according to claim 2, wherein said resilient urging means comprise a pair of spring members coupled between said pair of support brackets and said swing frame.

4. An image processor according to claim 1, wherein;

said document conveyor means further comprises resilient urging means for resiliently urging said document suppressing plate in a manner to cause the main portion thereof to be resiliently urged toward said transparent plate, and said second position restriction means are brought into contact with the upper surface of said transparent plate by the resilient urging action of said resilient urging means.

5. An image processor according to claim 4, wherein said resilient urging means comprise a pair of spring members coupled between said document suppressing plate and said swing frame and spaced apart by a distance in the direction of width of said transparent plate.

6. An image processor according to claim 1, wherein;

said document conveyer means further comprises a pair of position restricting pieces on said document suppressing plate and spaced apart by a distance in the direction of width of said transparent plate, each of said pair of position restricting pieces includes a first protruding portion that provides downwardly nearly in alignment with said second shaft member, and a second protruding portion located at a distance upstream from said first protruding portion, with respect to the direction in which the documents are conveyed, when said swing frame is at said closed position, and said first protruding portion constitutes said first position restriction means, and said second protruding portion constitutes said second position restriction means.

7. An image processor according to claim 1, wherein the first space is from 0.25 to 0.35 mm, and the second space is from 0.45 to 0.55 mm.

8. An image processor according to claim 1, wherein said document conveying means further comprises means for rotating said document suppressing rollers in the direction in which the documents are conveyed with a peripheral speed slightly greater than the document-conveying speed of said document conveyer means.

9. An image processor according to claim 1, wherein said plurality of document suppressing rollers are mounted on said second shaft member spaced apart by a distance in the axial direction thereof.

10. An image processor according to claim 1, wherein:

said transparent plate comprises a first transparent plate member for the moving documents and having a relatively small size in a direction in which the moving documents are conveyed, and a second transparent plate member for the stationary documents and close to said first transparent plate member;

said swing frame in said closed position covers said first transparent plate and said second transparent plate and said image processor further comprises document reading means in said housing for reading moving documents conveyed on said first transparent plate member and stationary documents on said second transparent plate member.

11. An image processor according to claim 1, further comprising means pivotally mounting said swing frame on said housing so as to be adapted to swing on a swing axis which extends along a rear potion of said housing in the direction in which the documents are conveyed along said first transparent plate member.

\* \* \* \* \*